(12) United States Patent
Rojas et al.

(10) Patent No.: US 8,681,041 B2
(45) Date of Patent: Mar. 25, 2014

(54) SYSTEM, METHOD, AND FILTER FOR TARGET TRACKING IN CARTESIAN SPACE

(75) Inventors: Randall R. Rojas, El Segundo, CA (US); James J. Hiroshige, Hawthorne, CA (US)

(73) Assignee: Raytheon Company, Waltham, MA (US)

( * ) Notice: Subject to any disclaimer, the term of this patent is extended or adjusted under 35 U.S.C. 154(b) by 357 days.

(21) Appl. No.: 13/069,287

(22) Filed: Mar. 22, 2011

(65) Prior Publication Data

US 2012/0242534 A1    Sep. 27, 2012

(51) Int. Cl.
*G01S 13/00* (2006.01)

(52) U.S. Cl.
USPC .................................. 342/95; 342/76; 342/96

(58) Field of Classification Search
USPC ................................................ 342/76, 95–96
See application file for complete search history.

(56) References Cited

U.S. PATENT DOCUMENTS

| 4,128,837 A * | 12/1978 | Page ................................ 342/67 |
| 2011/0121998 A1* | 5/2011 | Glover ........................... 340/961 |

OTHER PUBLICATIONS

:Hiroshig, James J., et al., "Tracking in Cartesian Space of Maneuvering Targets and Ownship: The Hiroshige-Rojas (HR) Filter", Raytheon, Space and Airborne Systems, El Segundo, California, 2008 (9 pgS.).*
Hiroshig, James J., et al. "Tracking in Cartesian Space of Maneuvering Targets and Ownship: The Hiroshige-Rojas (HR) Filter", Raytheon, Space and Airborne Systems, El Segundo, California, (9 pgs.), Jul. 2012.

* cited by examiner

*Primary Examiner* — Timothy A Brainard
(74) *Attorney, Agent, or Firm* — Christie, Parker & Hale, LLP

(57) ABSTRACT

An angle-only tracking filter includes: a target angle discriminant unit configured to receive sensor signal outputs and form angle only observations of a target relative to an ownship; an ownship navigation filter configured to receive and filter ownship inertial navigation measurements; a model analyzer configured to receive and analyze the ownship inertial navigation measurements and select the order of target kinematics to be determined; and a target kinematics generator coupled to the angle discriminant unit, the navigation filter unit, and the model analyzation unit, including: a first-order filter unit configured to generate a target position from the target angle measurements and the ownship inertial navigation information; a second-order filter unit configured to generate a target velocity from the target angle measurements and the ownship inertial navigation information; and a third-order filter unit configured to generate a target acceleration from the target angle measurements and the ownship inertial navigation information.

12 Claims, 4 Drawing Sheets

SYSTEM, METHOD, AND FILTER FOR TARGET TRACKING IN CARTESIAN SPACE

BACKGROUND

1. Field

Embodiments described herein relate in general to angle-only tracking filters.

2. Description of Related Art

When a rapidly moving target is being tracked it is advantageous to precisely determine the position, velocity, and acceleration of the target. Based on relative (ownship-to-target) angle observations, angle-only filters such as a conventional Modified Spherical Coordinate (MSC) filters have success in estimating the range of the target. However, conventional MSC filters perform poorly when estimating a rapidly accelerating target's position, velocity, and acceleration.

SUMMARY

Aspects according to embodiments of the present invention use sample angle measurements of a moving target and ownship kinematics to accurately determine the target's position, velocity, and acceleration.

Additionally, aspects according to embodiments of the present invention also incorporate $n^{th}$ order kinematics equations to improve the prediction accuracy of a rapidly moving target's position, velocity, and acceleration.

According to an embodiment of the present invention, an angle-only tracking filter includes: a target angle discriminant unit configured to receive sensor signal outputs and form angle only observations of a target relative to an ownship; an ownship navigation filter configured to receive and filter ownship inertial navigation measurements; a model analyzer coupled to the target angle discriminant unit and the ownship navigation filter, the model analyzer configured to receive and analyze the ownship inertial navigation measurements and select the order of target kinematics to be determined; and a target kinematics generator coupled to the angle discriminant unit, the navigation filter unit, and the model analyzation unit.

The target kinematics generation unit including: a first-order filter unit configured to generate a target position from the target angle measurements and the ownship inertial navigation information; a second-order filter unit configured to generate a target velocity from the target angle measurements and the ownship inertial navigation information; and a third-order filter unit configured to generate a target acceleration from the target angle measurements and the ownship inertial navigation information.

The ownship inertial navigation measurements may include an ownship position, an ownship velocity, and an ownship acceleration.

The target kinematics generator may be configured to generate X and Y target state vectors for each of the target position, the target velocity, and the target acceleration, when at least six target angle measurements and at least six inertial navigation measurements are provided.

The target kinematics generator may be further configured to generate the state vectors according to the matrix equation:

$$\underbrace{\begin{pmatrix} obs_1 & -1 & obs_1\Delta t(1) & -\Delta t(1) & \frac{1}{2}\Delta t^2(1) & obs_1 - \frac{1}{2}\Delta t^2(1) \\ obs_2 & -1 & obs_2\Delta t(2) & -\Delta t(2) & \frac{1}{2}\Delta t^2(2) & obs_2 - \frac{1}{2}\Delta t^2(2) \\ \vdots & \vdots & \vdots & \vdots & \vdots & \vdots \\ obs_n & -1 & obs_n\Delta t(n) & -\Delta t(n) & \frac{1}{2}\Delta t^2(n) & obs_n - \frac{1}{2}\Delta t^2(n) \end{pmatrix}}_{H} \underbrace{\begin{pmatrix} x^{tgt} \\ y^{tgt} \\ v^{tgt}_{0x} \\ v^{tgt}_{0y} \\ a^{tgt}_{0x} \\ a^{tgt}_{0y} \end{pmatrix}}_{\overline{s}} = \quad (1)$$

$$\underbrace{\begin{pmatrix} obs_1 x^{os}(0) - y^{os}(0) \\ obs_2 x^{os}(0) - y^{os}(0) \\ \vdots \\ obs_n x^{os}(0) - y^{os}(0) \end{pmatrix}}_{\overline{b}}$$

The target angle measurements may be smoothed monopulse measurements.

According to another embodiment of the present invention, an angle-only tracking system includes: a sensor configured to detect a target; a sensor signal processor configured to receive the sensor output and generate angle measurements of a target relative to an ownship; an ownship inertial navigation unit configured to detect and output a position, a velocity, and an acceleration of the ownship; an angle-only tracking filter configured to generate target kinematics, the angle-only tracking filter coupled to the sensor signal processor and the inertial navigation, the angle-only tracking filter comprising: a target angle discriminant unit configured to receive sensor signal outputs and form angle-only observations of a target relative to an ownship; an ownship navigation filter configured to receive and filter ownship inertial navigation measurements; a model analyzer coupled to the target angle discriminant unit and the ownship navigation filter, the model analyzer configured to receive and analyze the ownship inertial navigation measurements and select the order of target kinematics to be determined; and a target kinematics generator coupled to the angle discriminant unit, the navigation filter unit, and the model analyzation unit. The target kinematics generation unit includes: a first-order filter unit configured to generate a target position from the target angle measurements and the ownship inertial navigation information; a second-order filter unit configured to generate a target velocity from the target angle measurements and the ownship inertial navigation information; and a third-order filter unit configured to generate a target acceleration from the target angle measurements and the ownship inertial navigation information; and a kinematics smoothing filter coupled to the angle-only tracking filter, the kinematics smoothing filter configured to smooth the target kinematics measurements.

The ownship inertial navigation measurements may include an ownship position, an ownship velocity, and an ownship acceleration.

The target kinematics generator may be configured to generate X and Y target state vectors for each of the target position, the target velocity, and the target acceleration, when at least six target angle measurements and at least six inertial navigation measurements are provided.

The target kinematics generator may be configured to generate the state vectors according to the matrix equation:

$$\overbrace{\begin{pmatrix} obs_1 & -1 & obs_1\Delta t(1) & -\Delta t(1) & \frac{1}{2}\Delta t^2(1) & obs_1 - \frac{1}{2}\Delta t^2(1) \\ obs_2 & -1 & obs_2\Delta t(2) & -\Delta t(2) & \frac{1}{2}\Delta t^2(2) & obs_2 - \frac{1}{2}\Delta t^2(2) \\ \vdots & \vdots & \vdots & \vdots & \vdots & \vdots \\ obs_n & -1 & obs_n\Delta t(n) & -\Delta t(n) & \frac{1}{2}\Delta t^2(n) & obs_n - \frac{1}{2}\Delta t^2(n) \end{pmatrix}}^{H} \overbrace{\begin{pmatrix} x^{tgt} \\ y^{tgt} \\ v_{0x}^{tgt} \\ v_{0y}^{tgt} \\ a_{0x}^{tgt} \\ a_{0y}^{tgt} \end{pmatrix}}^{\bar{s}} = \quad (1)$$

$$\overbrace{\begin{pmatrix} obs_1 x^{os}(0) - y^{os}(0) \\ obs_2 x^{os}(0) - y^{os}(0) \\ \vdots \\ obs_n x^{os}(0) - y^{os}(0) \end{pmatrix}}^{\bar{b}}$$

According to another embodiment of the present invention, a method for target tracking includes: observing the target and taking sensor readings of the target; computing target angle measurements; performing target angle discrimination; detecting ownship kinematics; filtering ownship kinematics; analyzing ownship and target data and determining the target kinematics model; generating target kinematics in accordance with the target angle discriminants and ownship kinematics; and smoothing the target kinematics.

Determining the target kinematics model may include determining the performance of first order, second order, third order, or higher kinematics equations in accordance with analyzing the ownship inertial navigation measurements and the target angle discriminants.

Generating target kinematics may include generating the state vectors according to the matrix equation:

$$\overbrace{\begin{pmatrix} obs_1 & -1 & obs_1\Delta t(1) & -\Delta t(1) & \frac{1}{2}\Delta t^2(1) & obs_1 - \frac{1}{2}\Delta t^2(1) \\ obs_2 & -1 & obs_2\Delta t(2) & -\Delta t(2) & \frac{1}{2}\Delta t^2(2) & obs_2 - \frac{1}{2}\Delta t^2(2) \\ \vdots & \vdots & \vdots & \vdots & \vdots & \vdots \\ obs_n & -1 & obs_n\Delta t(n) & -\Delta t(n) & \frac{1}{2}\Delta t^2(n) & obs_n - \frac{1}{2}\Delta t^2(n) \end{pmatrix}}^{H} \overbrace{\begin{pmatrix} x^{tgt} \\ y^{tgt} \\ v_{0x}^{tgt} \\ v_{0y}^{tgt} \\ a_{0x}^{tgt} \\ a_{0y}^{tgt} \end{pmatrix}}^{\bar{s}} = \quad (1)$$

$$\overbrace{\begin{pmatrix} obs_1 x^{os}(0) - y^{os}(0) \\ obs_2 x^{os}(0) - y^{os}(0) \\ \vdots \\ obs_n x^{os}(0) - y^{os}(0) \end{pmatrix}}^{\bar{b}}$$

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
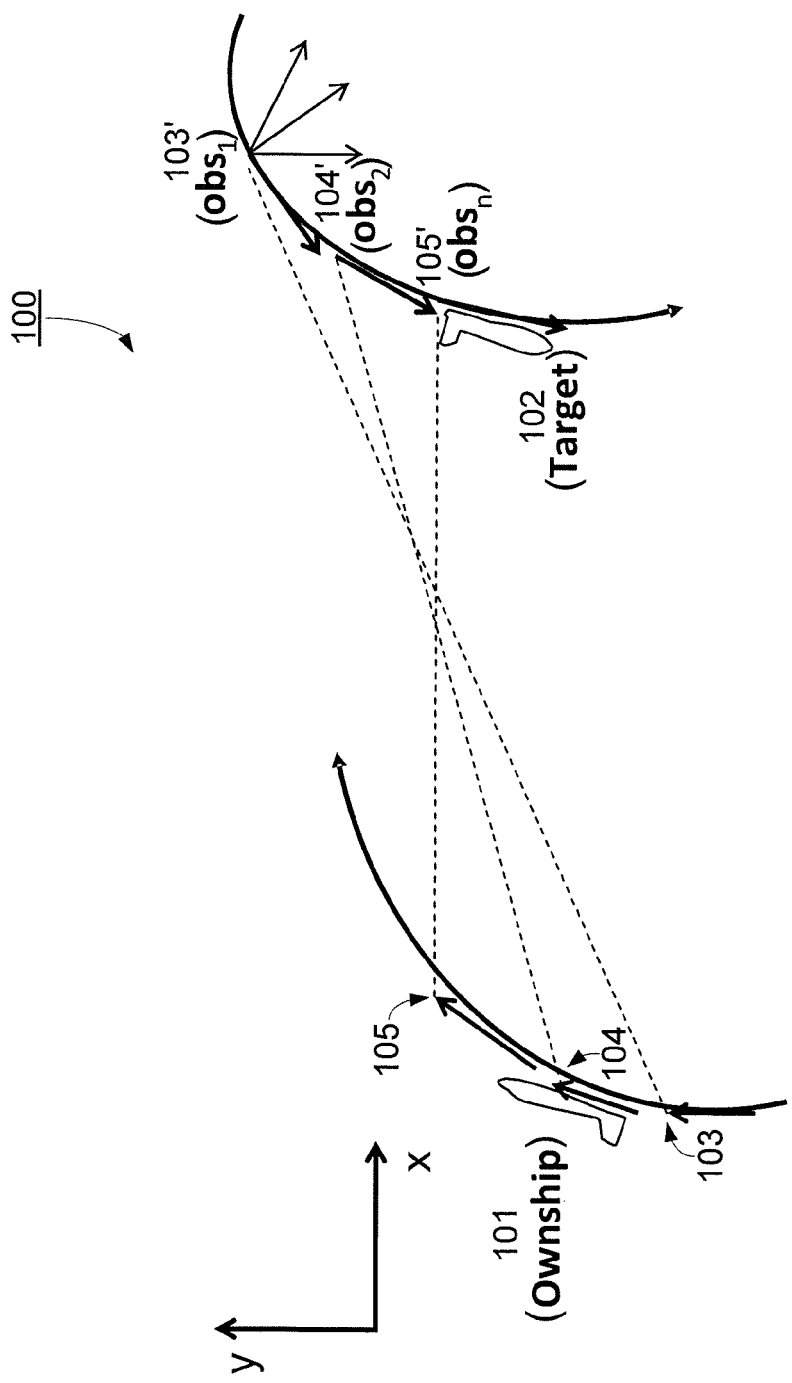
FIG. 1 is an illustration of target-to-ownship observations according to an embodiment of the present invention.

A particle's motion in the absence of external and/or internal forces is typically described by the defining relation:

$$\frac{d\vec{r}}{dt} = \vec{v} \quad \text{(Eq. 1)}$$

Where $\vec{r}$ and $\vec{v}$ correspond to the particle's three dimensional position and velocity respectively. The typical treatment of this system is to integrate both sides of Equation 1 with respect to (w.r.t) t and assuming the velocity ($\vec{v}$) is independent of time (kinematics parameters are assumed in SI units unless stated otherwise):

$$\int_{r_o}^{r} d\vec{r}' = \int_{t_o}^{t} \vec{v} dt' \rightarrow \vec{r} = \vec{r}_o + \vec{v} dt' \quad \text{(Eq. 2)}$$

where without loss of generality we set $t_0=0$. In the case of a particle undergoing uniformly accelerated motion (with constant acceleration a), we integrate the relation $$\frac{d^2\vec{r}}{dt^2} = \frac{d\vec{v}}{dt} = \vec{a} \quad \text{(Eq. 3)}$$

it then follows that $$\int_{v_o}^{v} d\vec{v}' = \int_{t_o}^{t} \vec{a} dt' \quad \text{(Eq. 4)}$$

$$\rightarrow \vec{v} = \vec{v}_o + \vec{a} t$$

And combining Equations 2 and 4 yields the result:

$$\int_{r_o}^{r} d\vec{r} = \int_{t_o}^{t} (\vec{v}_o + \vec{a} t') dt' \quad \text{(Eq. 5)}$$

$$\rightarrow \vec{r} = \vec{r}_o + \vec{v}_o t + \frac{1}{2}\vec{a} t^2$$

However, when tracking an object that does not have uniformly constant acceleration, higher order kinematics equations may be used to capture the underlying dynamics of such maneuvering objects. For instance, aircrafts in an air-to-air combat situation may be subject to various accelerations, some of which may not be constant. Conventional angle-only systems fail to account for non-uniform accelerations, and thus are unable to accurately capture the underlying dynamics of maneuvering targets and ownship.

To account for non-uniform acceleration, an embodiment of the present invention uses a generalized solution to the $n^{th}$ order differential equation:

$$\frac{d^n \vec{r}}{dt^n} = \vec{k}_n \quad \text{(Eq. 6)}$$

where $\vec{k}_n$ is a constant and the subscript n indicates the corresponding derivative. For example, in Equations 2 and 3 above, $\vec{k}_2 = \vec{v}$ and $\vec{k}_4 = \vec{a}$ respectively.

For the time varying acceleration case (n=3), where $d\vec{a}/dt = \vec{k}_3$:

$$\frac{d^2 \vec{r}}{dt^3} = \frac{d\vec{a}}{dt} = \vec{k}_3 \rightarrow \int_{a_0}^{a} d\vec{a}' = \int_{t_0}^{t} \vec{k}_3 dt' \therefore \vec{a} = \vec{a}_0 + \vec{k}_2 t \quad \text{(Eq. 7)}$$

Letting $\vec{k}_3 = \dot{\vec{a}}_0$ (herein, Newton's notation is used in which the dot above the letter represents a time derivative of that variable, two dots above the variable indicate a second order derivative w.r.t time, and etc.) and integrating Equation 7 two more times (w.r.t) t yields the velocity and position vectors, respectively:

$$\int_{v_0}^{v} d\vec{v}' = \int_{t_0}^{t} (\vec{a}_o + \dot{\vec{a}}_o t) dt' \quad \text{(Eq. 8)}$$

$$\rightarrow \vec{v} = \vec{v}_o + \vec{a}_o t + \frac{1}{2} \dot{\vec{a}}_o t^2 \quad \text{(Eq. 9)}$$

and $$\int_{r_0}^{r} d\vec{r}' = \int_{t_0}^{t} \left( \vec{v}_0 + \vec{v}_0 + \vec{a}_0 t' + \frac{1}{2} \dot{\vec{a}}_0 t'^2 \right) dt' \rightarrow \vec{r} = \quad \text{(Eq. 10)}$$

$$\vec{r}_0 + \vec{v}_0 t + \frac{1}{2} \vec{a}_0 t^2 + \frac{1}{3!} \dot{\vec{a}}_0 t^2.$$

Equation 10 can be rewritten as $$\vec{r} = \frac{1}{0!} \vec{r}_0 + \frac{1}{1!} \vec{v}_0 t + \frac{1}{2!} \vec{a}_0 t^2 + \frac{1}{3!} \dot{\vec{a}}_0 t^3 \quad \text{(Eq. 11)}$$

and the natural order extension to the $n^{th}$ order can be expressed as:

$$\vec{r} = \frac{1}{0!} \vec{k}_0 + \frac{1}{1!} \vec{k}_1 t + \frac{1}{2!} \vec{k}_2 t^2 + \frac{1}{3!} \vec{k}_3 t^3 + \ldots + \frac{1}{n!} \vec{k}_n t^n \quad \text{(Eq. 12)}$$

$$\vec{r} = \sum_{n=0}^{\infty} \frac{1}{n!} \vec{k}_n t^n$$

Based on angle-only observations ("obs") of the target of interest relative to the ownship, we obtain systems of equations according to the order of the defining differential equations integrated. Below, we show how for a reasonable estimate of the target's velocity, knowledge of the target's and ownship's acceleration are needed. Thus, to estimate the target's acceleration, information about the rate of change of the accelerations involved are needed (i.e., $\dot{a}$).

To estimate the position (first-order estimate), observations are related to the kinematics equations according to:

$$obs_1 = \frac{y^{tgt}(1) - y^{os}(0)}{x^{tgt}(1) - x^{os}(0)} \quad \text{(Eq. 13)}$$

$$obs_2 = \frac{y^{tgt}(1) + v_{0y}^{tgt} \Delta t(2) - y^{os}(0)}{x^{tgt}(1) + v_{0x}^{tgt} \Delta t(2) - x^{os}(0)}$$

$$\vdots$$

$$obs_n = \frac{y^{tgt}(1) + v_{0y}^{tgt} \Delta t(n) - y^{os}(0)}{x^{tgt}(1) + v_{0x}^{tgt} \Delta t(n) - x^{os}(0)}$$

Where ownship coordinates are denoted as ("OS") and target coordinates are denoted as ("tgt"). Thus, based on Equation 13 the target's position can be estimated knowing its velocity.

To estimate the velocity (second-order estimate), observations are related to the kinematics equations according to:

$$obs_1 = \frac{y^{tgt}(1) - y^{os}(0)}{x^{tgt}(1) - x^{os}(0)} \quad \text{(Eq. 14)}$$

$$obs_2 = \frac{y^{tgt}(1) + v_{0y}^{tgt} \Delta t(2) + \frac{1}{2!} a_{0y}^{tgt} \Delta t^2(2) - y^{os}(0)}{x^{tgt}(1) + v_{0x}^{tgt} \Delta t(2) + \frac{1}{2!} a_{0x}^{tgt} \Delta t^2(2) - x^{os}(0)}$$

$$\vdots$$

$$obs_n = \frac{y^{tgt}(1) + v_{0y}^{tgt} \Delta t(n) + \frac{1}{2!} a_{0y}^{tgt} \Delta t^2(n) - y^{os}(0)}{x^{tgt}(1) + v_{0x}^{tgt} \Delta t(n) + \frac{1}{2!} a_{0x}^{tgt} \Delta t^2(n) - x^{os}(0)}$$

In this case, the target's acceleration allows us to estimate the corresponding velocity and position.

To estimate the acceleration (third order estimate (and higher)), observations are related to the kinematics equations according to:

The ownship position, velocity, and acceleration may be known from the navigation system. The rate of change of the acceleration ($\dot{\vec{a}}^{OS}$) can be estimated.

$$obs_1 = \frac{y^{tgt}(1) - y^{os}(0)}{x^{tgt}(1) - x^{os}(0)} \quad \text{(Eq. 15)}$$

$$obs_2 = \frac{y^{tgt}(1) + v_{0y}^{tgt} \Delta t(2) + \frac{1}{2!} a_{0y}^{tgt} \Delta t^2(2) + \frac{1}{3!} \dot{a}_{0y}^{tgt} \Delta t^3(2) + \ldots + \mathcal{O}(\Delta t^n) - y^{os}(0)}{x^{tgt}(1) + v_{0x}^{tgt} \Delta t(2) + \frac{1}{2!} a_{0x}^{tgt} \Delta t^2(2) + \frac{1}{3!} \dot{a}_{0x}^{tgt} \Delta t^3(2) + \ldots + \mathcal{O}(\Delta t^n) - x^{os}(0)}$$

$$\vdots$$

$$obs_n = \frac{y^{tgt}(1) + v_{0y}^{tgt} \Delta t(n) + \frac{1}{2!} a_{0y}^{tgt} \Delta t^2(n) + \frac{1}{3!} \dot{a}_{0y}^{tgt} \Delta t^3(n) + \ldots + \mathcal{O}(\Delta t^n) - y^{os}(0)}{x^{tgt}(1) + v_{0x}^{tgt} \Delta t(n) + \frac{1}{2!} a_{0x}^{tgt} \Delta t^2(n) + \frac{1}{3!} \dot{a}_{0x}^{tgt} \Delta t^3(n) + \ldots + \mathcal{O}(\Delta t^n) - x^{os}(0)}$$

An estimate of the target's acceleration, velocity and, position can be obtained. Multiplying the denominator in Eq. 15 by ($obs_n$), Eq. 15 can be rewritten as:

$$obs_n\left(x^{tgt}(1) + v^{tgt}_{0x}\Delta t(n) + \frac{1}{2!}a^{tgt}_{0x}\Delta t^2(n) + \frac{1}{3!}\dot{a}^{tgt}_{0x}\Delta t^3(n) + \right. \quad \text{(Eq. 16)}$$
$$\left. \ldots + \vartheta(\Delta t^n) - x^{os}(0)\right) = y^{tgt}(1) + v^{tgt}_{0y}\Delta t(n) +$$
$$\frac{1}{2!}a^{tgt}_{0y}\Delta t^2(n) + \frac{1}{3!}\dot{a}^{tgt}_{0y}\Delta t^3(n) + \ldots + \vartheta(\Delta t^n) - y^{os}(0)$$

To estimate six state vectors ($x^{tgt}$; $y^{tgt}$; $v_x^{tgt}$; $v_y^{tgt}$; $a_x^{tgt}$; $a_y^{tgt}$) (i.e., six unknowns), at least six observations are needed to estimate the state vector. A matrix representation of Eq. 16 may be more suitable for implementation, and may be expressed as Eq. 17 below:

$$\overbrace{\begin{pmatrix} obs_1 & -1 & obs_1\Delta t(1) & -\Delta t(1) & \frac{1}{2}\Delta t^2(1) & obs_1 - \frac{1}{2}\Delta t^2(1) \\ obs_2 & -1 & obs_2\Delta t(2) & -\Delta t(2) & \frac{1}{2}\Delta t^2(2) & obs_2 - \frac{1}{2}\Delta t^2(2) \\ \vdots & \vdots & \vdots & \vdots & \vdots & \vdots \\ obs_n & -1 & obs_n\Delta t(n) & -\Delta t(n) & \frac{1}{2}\Delta t^2(n) & obs_n - \frac{1}{2}\Delta t^2(n) \end{pmatrix}}^{H} \quad \text{(Eq. 17)}$$

$$\overbrace{\begin{pmatrix} x^{tgt} \\ y^{tgt} \\ v^{tgt}_{0x} \\ v^{tgt}_{0y} \\ a^{tgt}_{0x} \\ a^{tgt}_{0y} \end{pmatrix}}^{\vec{S}}_{(1)} = \overbrace{\begin{pmatrix} obs_1 x^{os}(0) - y^{os}(0) \\ obs_2 x^{os}(0) - y^{os}(0) \\ \vdots \\ obs_n x^{os}(0) - y^{os}(0) \end{pmatrix}}^{\vec{b}}$$

(for the instances where n>=6)

In matrix notation, and making use of standard Least Squares, Eq. 17 can be solved for the state vector $\vec{S}$ as follows:

$$H\vec{S} = \vec{b} \quad \text{(Eq. 18)}$$
$$\downarrow$$
$$H^T H \vec{S} = H^T \vec{b}$$
$$\downarrow$$
$$\vec{S} = (H^T H)^{-1} H^T \vec{b}$$

In order to better quantify the performance of the algorithm, the estimate can be compared against truth using Monte Carlo runs to generate noisy observations. We then run the algorithm, compare results against truth, and collect statistics to assess performance.

To transform the ownship 2D Polar coordinates (r, θ) to 2D Cartesian coordinates (x, y), the standard Polar to Rectangular transformation is x=r cos θ, and y=−r sin θ. (The negative is a result of sign convention. Herein, clockwise rotations from the x-axis are considered positive.)

The respective velocities and accelerations according to:

$$\dot{x} = -r\dot{\theta} \sin \theta \quad \text{(Eq. 19)}$$

$$\dot{y} = -r\dot{\theta} \cos \theta \quad \text{(Eq. 20)}$$

and assuming $\ddot{\theta} \sim 0$ $$\ddot{x} = -r\dot{\theta}^2 \cos \theta \quad \text{(Eq. 21)}$$

$$\ddot{y} = r\dot{\theta}^2 \sin \theta \quad \text{(Eq. 22)}$$

where the ownship initial position, velocity, and acceleration are now given by:
$(x^{OS}(0), y^{OS}(0))=(r \cos \theta, -r \sin \theta)$, $(v_{0x}^{OS}, v_{0y}^{OS})=(\dot{x}, \dot{y})$ and $(a_{0x}^{OS}, a_{0y}^{OS})=(\ddot{x}, \ddot{y})$, respectively. Since the classical rotational motion relations still hold, then $r=v^2/a$. Because we need at least six observations to have a closed system of equations, we discretize the time variable t as t=[1:6]Δt, where Δt=1.5. The results however, are not sensitive to the choice of Δt.

As a test case, we set the initial ownship and target parameters (velocity, acceleration, and position) respectively, to $v^{OS}$=300 ft/s, $a^{OS}$=1 g (32 ft/s$^2$), θ=90°, ($x^{tgt}$, $y^{tgt}$)=(43, 20)nmi, ($v_{0x}^{tgt}$, $v_{0y}^{tgt}$)=(100, 0)ft/s, and ($a_{0x}^{tgt}$, $a_{0y}^{tgt}$)=(0, 32)ft/s$^2$. We then vary the ownship acceleration and observation noise to generate synthetic (simulated) data as described below. FIG. 1 illustrates a sample scenario of a maneuvering ownship tracking a maneuvering target.

Tables 1, 2 and 3 summarize the results obtained when given the target-ownship geometry above, the ownship acceleration is from 1 g to 3 g and the observation noise is varied from 1 mrad to 3 mrad, but varied the same for each observation. We compute the errors on the estimate of the state vector and for each case, run 1000 Monte Carlo simulations to collect statistics (mean and standard deviation) on the errors. Although the same error is applied to each observation, this shows that given high resolution data, the algorithm performs very well in the presence of maneuvers.

In Table 4, we show results for the case when different noise amounts are added to each observation. As can be clearly seen from Tables 1, 2, and 3, an impressive estimate of the state vector is achieved when both target and ownship are maneuvering. To date, no other filter achieves this performance for maneuvering targets and ownship.

TABLE 1

Table 1: Results for the case $a^{OS}$ = 1g and $Obs_{Error}$ varying from 1 mrad to 3 mrad.

| Target State Vector $\vec{S}$ (Ownship a = 1g) | $Obs_{Error}$ = 1 mrad $\mu\delta\vec{S} \pm \sigma\delta\vec{S}$ | $Obs_{Error}$ = 2 mrad $\mu\delta\vec{S} \pm \sigma\delta\vec{S}$ | $Obs_{Error}$ = 3 mrad $\mu\delta\vec{S} \pm \sigma\delta\vec{S}$ |
|---|---|---|---|
| x [ft] | −2.821611 ± 583.8060 | −28.6725 ± 1148.8840 | −24.4133 ± 1803.5082 |
| y [ft] | −19.6880 ± 533.5441 | −21.6587 ± 1057.7580 | −21.7217 ± 1671.4879 |
| $v_x$ [ft/s] | 1.9695 ± 14.0666 | 1.6027 ± 14.5216 | 1.4676 ± 14.5692 |
| $v_y$ [ft/s] | 48.9204 ± 6.5721 | 48.7552 ± 6.7871 | 48.6981 ± 6.8117 |

TABLE 1-continued

Table 1: Results for the case $a^{OS} = 1g$ and $Obs_{Error}$ varying from 1 mrad to 3 mrad.

| Target State Vector $\vec{S}$ (Ownship a = 1g) | $Obs_{Error}$ = 1 mrad $\mu\delta\vec{S} \pm \sigma\delta\vec{S}$ | $Obs_{Error}$ = 2 mrad $\mu\delta\vec{S} \pm \sigma\delta\vec{S}$ | $Obs_{Error}$ = 3 mrad $\mu\delta\vec{S} \pm \sigma\delta\vec{S}$ |
|---|---|---|---|
| $a_x$ [ft/s$^2$] | −0.1525 ± 1.0877 | −0.1252 ± 1.1884 | −0.1142 ± 1.2759 |
| $a_y$ [ft/s$^2$] | −0.0709 ± 0.5047 | −0.0590 ± 0.5520 | −0.0553 ± 0.5935 |

The means of the relative errors (estimate-truth) $\mu\delta\vec{S}$ and the respective standard deviation $\sigma\delta\vec{S}$ are listed for each component of the target's state vector. The mean and standard deviation are computed over 1000 Monte Carlo simulations.

TABLE 2

Table 2: Results for the case $a^{OS} = 2g$ and $Obs_{Error}$ varying from 1 mrad to 3 mrad.

| Target State Vector $\vec{S}$ (Ownship a = 2g) | $Obs_{Error}$ = 1 mrad $\mu\delta\vec{S} \pm \sigma\delta\vec{S}$ | $Obs_{Error}$ = 2 mrad $\mu\delta\vec{S} \pm \sigma\delta\vec{S}$ | $Obs_{Error}$ = 3 mrad $\mu\delta\vec{S} \pm \sigma\delta\vec{S}$ |
|---|---|---|---|
| x [ft] | −13.2292 ± 658.9139 | −16.4663 ± 1288.8575 | 11.5976 ± 1888.1970 |
| y [ft] | −11.4778 ± 570.0022 | −16.6892 ± 1127.2600 | 4.8485 ± 1651.7824 |
| $v_x$ [ft/s] | −0.3927 ± 9.0588 | 0.2584 ± 17.3353 | −0.1198 ± 25.2021 |
| $v_y$ [ft/s] | 48.1426 ± 4.2214 | 48.1550 ± 8.0797 | 48.0184 ± 11.7389 |
| $a_x$ [ft/s$^2$] | −0.0287 ± 1.1401 | −0.0303 ± 2.2164 | 0.0179 ± 3.2381 |
| $a_y$ [ft/s$^2$] | −0.0128 ± 0.4479 | −0.0165 ± 0.8698 | −0.0026 ± 1.2693 |

The means of the relative errors (estimate-truth) $\mu\delta\vec{S}$ and the respective standard deviation $\sigma\delta\vec{S}$ are listed for each component of the target's state vector. The mean and standard deviation are computed over 1000 Monte Carlo simulations.

TABLE 3

Table 3: Results for the case $a^{OS} = 3g$ and $Obs_{Error}$ varying from 1 mrad to 3 mrad.

| Target State Vector $\vec{S}$ (Ownship a = 3g) | $Obs_{Error}$ = 1 mrad $\mu\delta\vec{S} \pm \sigma\delta\vec{S}$ | $Obs_{Error}$ = 2 mrad $\mu\delta\vec{S} \pm \sigma\delta\vec{S}$ | $Obs_{Error}$ = 3 mrad $\mu\delta\vec{S} \pm \sigma\delta\vec{S}$ |
|---|---|---|---|
| x [ft] | −15.7222 ± 730.0495 | 77.337 ± 1509.0134 | −71.1848 ± 2140.1431 |
| y [ft] | −14.2530 ± 602.9830 | 60.1873 ± 1245.6929 | −65.5523 ± 1767.5398 |
| $v_x$ [ft/s] | 0.3259 ± 18.6957 | −2.0580 ± 38.6471 | 1.7593 ± 54.8052 |
| $v_y$ [ft/s] | 48.1705 ± 8.6989 | 47.1229 ± 17.9652 | 48.9802 ± 25.4980 |
| $a_x$ [ft/s$^2$] | −0.0505 ± 2.5063 | 0.2690 ± 5.1807 | −0.2415 ± 7.3473 |
| $a_y$ [ft/s$^2$] | −0.0221 ± 0.9739 | 0.0938 ± 2.0110 | −0.1155 ± 2.8549 |

The means of the relative errors (estimate-truth) $\mu\delta\vec{S}$ and the respective standard deviation $\sigma\delta\vec{S}$ are listed for each component of the target's state vector. The mean and standard deviation are computed over 1000 Monte Carlo simulations.

Table 4 provides the revised calculated errors. The increase in the errors is caused by the added noise. However, if the observations have large accuracy, the algorithm performs extraordinarily well.

TABLE 4

Table 4: Results for the case $a^{OS} = 1g$ and $Obs_{Error}$ varying from 1 mrad to 3 mrad.

| Target State Vector $\vec{S}$ (Ownship a = 1g) | $Obs_{Error}$ = 1 mrad $\mu\delta\vec{S} \pm \sigma\delta\vec{S}$ |
|---|---|
| x [ft] | −14774.0823 ± 79423.0807 |
| y [ft] | −6881.7145 ± 36994.9860 |
| $v_x$ [ft/s] | 1168.4786 ± 6275.8511 |
| $v_y$ [ft/s] | 589.9817 ± 2910.9981 |
| $a_x$ [ft/s$^2$] | −86.5495 ± 464.9702 |
| $a_y$ [ft/s$^2$] | −34.3322 ± 184.5267 |

The means of the relative errors (estimate-truth) $\mu\delta\vec{S}$ and the respective standard deviation $\sigma\delta\vec{S}$ are listed for each component of the target's state vector. The mean and standard deviation are computed over 1000 Monte Carlo simulations.

Exemplary embodiments will now be described more fully with reference to the accompanying drawings. Like reference numerals in the drawings denote like elements.

FIG. 1 is an illustration of target-to-ownship observation according to an embodiment of the present invention.

According to FIG. 1, an ownship 101, makes observations 103'-105' of the target 102. The observations 103'-105' reflect the ownship-to-target angle. Additionally, the ownship's inertial navigation unit also records the ownship kinematics 103-105 (e.g., velocity, 3D position, and acceleration). The change in acceleration may also be derived from the ownship's kinematics. The ownship may also maneuver in between observations. Maneuvering between observations allows for more varied observations and may increase the accuracy of estimating the target's kinematics.

Figure 2:
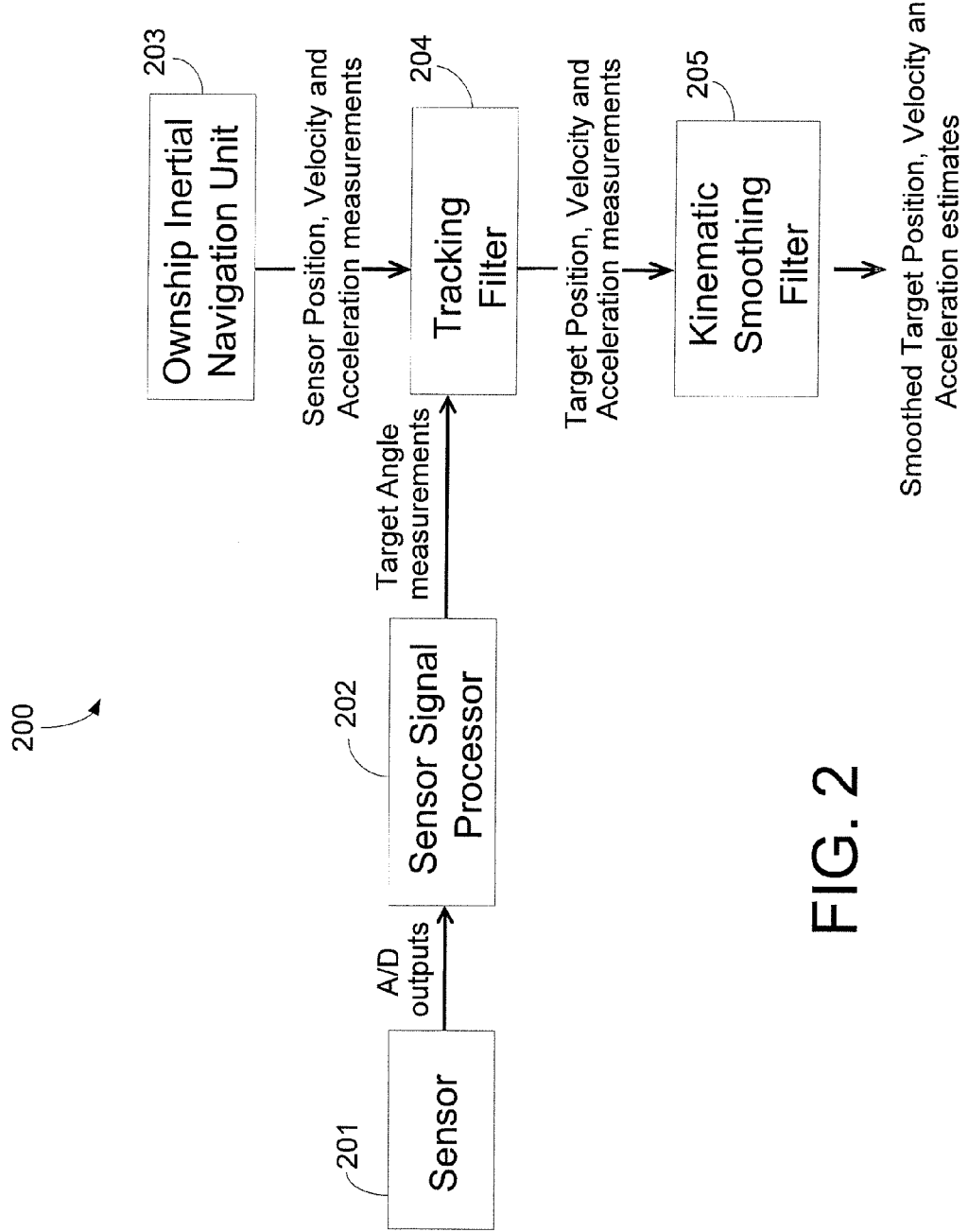
FIG. 2 is a system-level block diagram of an angle-only tracking system according to an embodiment of the present invention.

FIG. 2 is a block diagram of an angle-only tracking system according to an embodiment of the present invention. According to FIG. 2, an angle-only tracking system includes a sensor 201, a sensor signal processor 202 coupled to the sensor 201, an ownship inertial navigation unit 203, a tracking filter 204 coupled to the sensor signal processor 202 and the ownship inertial navigation unit 203, and a kinematics smoothing filter 205 coupled to the tracking filter 205.

The sensor 201 is configured to detect a target (e.g., target 102). The A/D outputs of the sensor may be processed by a sensor signal processor 202. The sensor signal processor 202 may generate target angle measurements. The ownship inertial navigation unit 203 detects and transmits the ownship kinematics information (e.g., sensor position, velocity, and acceleration) to the tracking filter 204. The tracking filter 204 is configured to receive the target angle measurements and the ownship kinematics information and generate the target kinematics information. A kinematics smoothing filter 205 may be configured to receive the target kinematics information and provided smoothed target position, velocity, and acceleration estimates.

Figure 3:
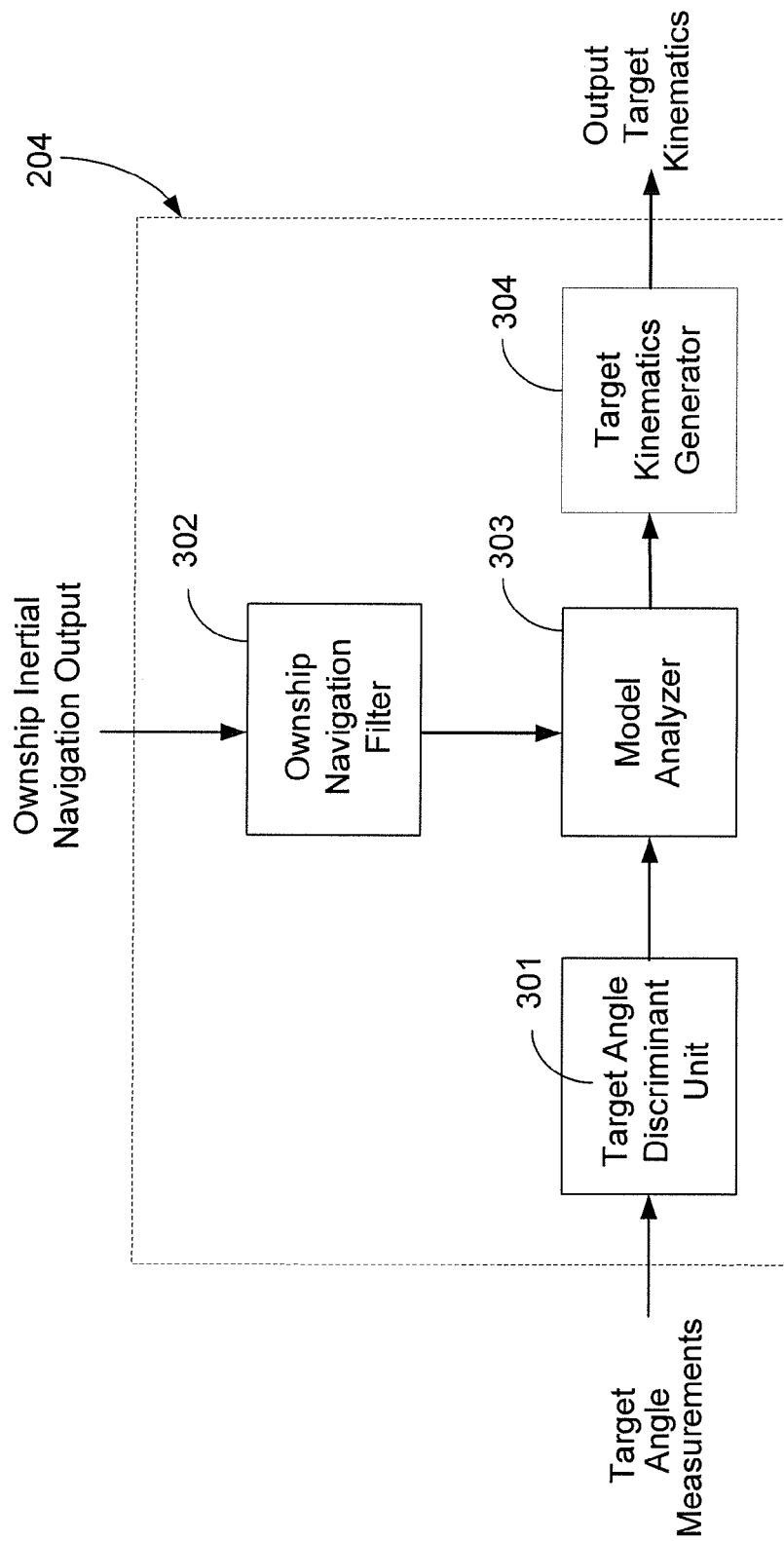
FIG. 3. is a block diagram of an angle-only tracking filter, which can be included in FIG. 2, according to an embodiment of the present invention.

FIG. 3. is a block diagram of angle-only tracking filter, which can be included in FIG. 2, according to an embodiment of the present invention. According to FIG. 3, the tracking filter 204 may include: a target angle discriminant unit 301 configured to receive sensor signal outputs and form angle-only observations of a target relative to an ownship; an ownship navigation filter 302 configured to receive and filter ownship inertial navigation measurements; a model analyzer 303 coupled to the target angle discriminant unit 301 and the ownship navigation filter 302, the model analyzer 303 is configured to receive and analyze the ownship inertial navigation measurements and select the order of target kinematics to be determined; and a target kinematics generator 304 coupled to the angle discriminant unit, the navigation filter unit, and the model analyzation unit.

The target kinematics generation unit 304 may include: a first-order filter unit configured to generate a target position from the target angle measurements and the ownship inertial navigation information; a second-order filter unit configured to generate a target velocity from the target angle measurements and the ownship inertial navigation information; and a third-order filter unit configured to generate a target acceleration from the target angle measurements and the ownship inertial navigation information.

Figure 4:
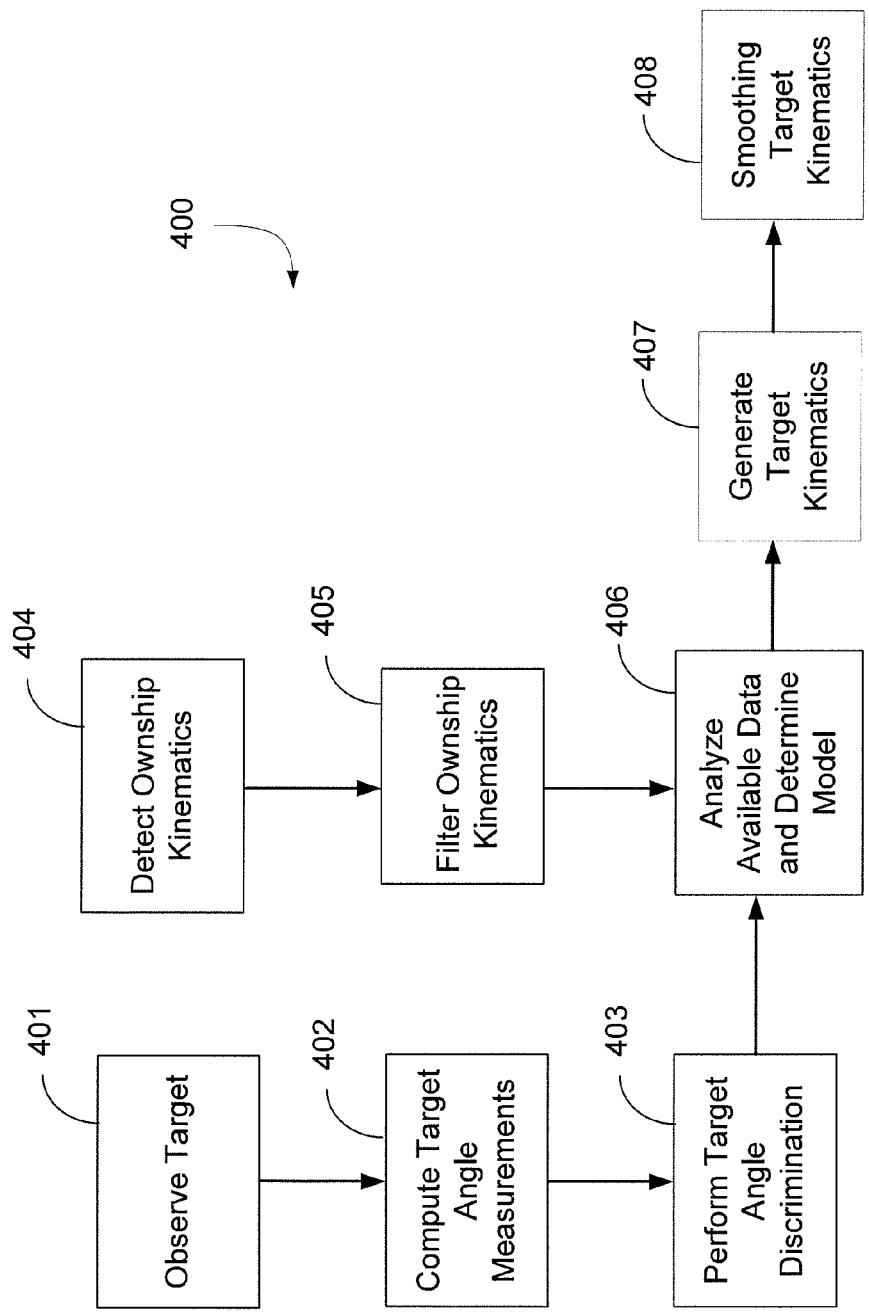
FIG. 4 is a flow chart of a method of angle-only tracking according to an embodiment of the present invention.

FIG. 4 is a flow chart of a method of angle-only tracking according to an embodiment of the present invention. According to FIG. 4, a method of angle-only tracking 400 includes observing the target 401, computing target angle measurements 402, performing target angle discrimination 403, detecting ownship kinematics 404, filtering ownship kinematics 405, analyzing ownship and target data to determine the model 406; generating target kinematics 407; and smoothing the target kinematics 408.

During the step of observing the target 401, a ownship sensor may take sensor readings of the target. Additionally, during the step of observing the target 401, the ownship may maneuver to take sensor readings from different positions and angles relative to the target.

During the step computing target angle measurements 402, the sensor signals may be processed to compute target angle measurements. During the step of performing target angle discrimination 403, the processed signals may further processed to determine the angle measurements of the target relative to the ownship.

During the step of detecting ownship kinematics 404, a sensor on the ownship may detect the ownship's kinematics (e.g., velocity, position, and acceleration). This may be a 3D detection. During the step of filtering ownship kinematics, the ownship sensor readings may be filtered. Additionally, an ownship's rate of change in acceleration may be derived from the ownship's kinematics.

During the step analyzing ownship and target data to determine the model 406, according to the type and amount of data available from the observation of the target and the ownship kinematics, the model order to be used in the step of generating target kinematics 407 is determined. For instance, determining the performance of first order, second order, third order, or higher kinematics in accordance with analyzing the ownship inertial navigation measurements and the target angle measurements.

During the step of generating target kinematics 407, target kinematics are generated according to the target angle measurements and the ownship kinematics. The target kinematics (e.g., the target state vectors for position, velocity, and acceleration) may be generated according to the equations described above. Additionally, during the step of smoothing the target kinematics 408 the target kinematics data generated may be smoothed for tracking the target.

While certain embodiments have been described above, it will be understood that the embodiments described are by way of example only. Accordingly, the descriptions herein should not be limited based on the described embodiments. Rather, the descriptions herein should only be limited in light of the claims that follow when taken in conjunction with the above description and accompanying drawings.

What is claimed is:

1. An angle-only tracking filter comprising:

a target angle discriminant unit configured to receive sensor signal outputs and form angle-only observations of a target relative to an ownship;

an ownship navigation filter configured to receive and filter ownship inertial navigation measurements;

a model analyzer coupled to the target angle discriminant unit and the ownship navigation filter, the model analyzer configured to receive and analyze the ownship inertial navigation measurements and select an order of target kinematics to be determined; and a target kinematics generator coupled to the target angle discriminant unit, the navigation filter unit, and the model analyzation unit, the target kinematics generator comprising:

a first-order filter unit configured to generate a target position from the target angle measurements and the ownship inertial navigation information;

a second-order filter unit configured to generate a target velocity from the target angle measurements and the ownship inertial navigation information; and a third-order filter unit configured to generate a target acceleration from the target angle measurements and the ownship inertial navigation information.

2. The angle-only tracking filter of claim 1, wherein the ownship inertial navigation measurements comprises an ownship position, an ownship velocity, and an ownship acceleration.

3. The angle-only tracking filter of claim 1, wherein the target kinematics generator is configured to generate X and Y target state vectors for each of the target position, the target velocity, and the target acceleration, when at least six target angle measurements and at least six inertial navigation measurements are provided.

4. The angle-only tracking filter of claim 1, wherein the target kinematics generator is configured to generate the state vectors according to the matrix equation:

$$\overbrace{\begin{pmatrix} obs_1 & -1 & obs_1\Delta t(1) & -\Delta t(1) & \frac{1}{2}\Delta t^2(1) & obs_1 - \frac{1}{2}\Delta t^2(1) \\ obs_2 & -1 & obs_2\Delta t(2) & -\Delta t(2) & \frac{1}{2}\Delta t^2(2) & obs_2 - \frac{1}{2}\Delta t^2(2) \\ \vdots & \vdots & \vdots & \vdots & \vdots & \vdots \\ obs_n & -1 & obs_n\Delta t(n) & -\Delta t(n) & \frac{1}{2}\Delta t^2(n) & obs_n - \frac{1}{2}\Delta t^2(n) \end{pmatrix}}^{H} \overbrace{\begin{pmatrix} x^{tgt} \\ y^{tgt} \\ v_{0x}^{tgt} \\ v_{0y}^{tgt} \\ a_{0x}^{tgt} \\ a_{0y}^{tgt} \end{pmatrix}}^{\overline{s}} =$$

$$\overbrace{\begin{pmatrix} obs_1 x^{os}(0) - y^{os}(0) \\ obs_2 x^{os}(0) - y^{os}(0) \\ \vdots \\ obs_n x^{os}(0) - y^{os}(0) \end{pmatrix}}^{\overline{b}}. \quad (1)$$

5. The angle-only tracking filter of claim 1, wherein the target angle measurements are smoothed monopulse measurements.

6. An angle-only tracking system comprising:
sensor configured to detect a target;
a sensor signal processor configured to receive the sensor output and generate angle measurements of a target relative to an ownship;
an ownship inertial navigation unit configured to detect and output a position, a velocity, and an acceleration of the ownship;
an angle-only tracking filter configured to generate target kinematics, the angle-only tracking filter coupled to the sensor signal processor and the inertial navigation, the angle-only tracking filter comprising:
  a target angle discriminant unit configured to receive sensor signal outputs and form angle only observations of a target relative to an ownship;
  an ownship navigation filter configured to receive and filter ownship inertial navigation measurements;
  a model analyzer coupled to the target angle discriminant unit and the ownship navigation filter, the model analyzer configured to receive and analyze the ownship inertial navigation measurements and select the order of target kinematics to be determined; and
  a target kinematics generator coupled to the angle discriminant unit, the navigation filter unit, and the model analyzation unit, the target kinematics generation unit comprising:
    a first-order filter unit configured to generate a target position from the target angle measurements and the ownship inertial navigation information;
    a second-order filter unit configured to generate a target velocity from the target angle measurements and the ownship inertial navigation information; and
    a third-order filter unit configured to generate a target acceleration from the target angle measurements and the ownship inertial navigation information; and
a kinematics smoothing filter coupled to the angle-only tracking filter, the kinematics smoothing filter configured to smooth the target kinematics measurements.

7. The angle-only tracking system of claim 6, wherein the ownship inertial navigation measurements comprises an ownship position, an ownship velocity, and an ownship acceleration.

8. The angle-only tracking system of claim 7, wherein the target kinematics generator is configured to generate X and Y target state vectors for each of the target position, the target velocity, and the target acceleration, when at least six target angle measurements and at least six inertial navigation measurements are provided.

9. The angle-only tracking system of claim 8, wherein the target kinematics generator is configured to generate the state vectors according to the matrix equation:

$$\overbrace{\begin{pmatrix} obs_1 & -1 & obs_1\Delta t(1) & -\Delta t(1) & \frac{1}{2}\Delta t^2(1) & obs_1 - \frac{1}{2}\Delta t^2(1) \\ obs_2 & -1 & obs_2\Delta t(2) & -\Delta t(2) & \frac{1}{2}\Delta t^2(2) & obs_2 - \frac{1}{2}\Delta t^2(2) \\ \vdots & \vdots & \vdots & \vdots & \vdots & \vdots \\ obs_n & -1 & obs_n\Delta t(n) & -\Delta t(n) & \frac{1}{2}\Delta t^2(n) & obs_n - \frac{1}{2}\Delta t^2(n) \end{pmatrix}}^{H} \overbrace{\begin{pmatrix} x^{tgt} \\ y^{tgt} \\ v_{0x}^{tgt} \\ v_{0y}^{tgt} \\ a_{0x}^{tgt} \\ a_{0y}^{tgt} \end{pmatrix}}^{\overline{s}} =$$

$$\overbrace{\begin{pmatrix} obs_1 x^{os}(0) - y^{os}(0) \\ obs_2 x^{os}(0) - y^{os}(0) \\ \vdots \\ obs_n x^{os}(0) - y^{os}(0) \end{pmatrix}}^{\overline{b}}.$$

10. A method for target tracking comprising:
observing the target and taking sensor readings of the target, by one or more sensors;
computing target angle measurements, by one or more processors;
performing target angle discrimination, by said one or more processors;
detecting ownship kinematics, by said one or more processors;
filtering ownship kinematics;
analyzing ownship and target data and determining the target kinematics model, by said one or more processors;
generating target kinematics in accordance with the target angle discriminants and ownship kinematics, by said one or more processors; and
smoothing the target kinematics, by said one or more processors.

11. The method for target tracking of claim 10, wherein determining the target kinematics model comprises determining the performance of first order, second order, or third order or higher kinematics equations in accordance with analyzing the ownship inertial navigation measurements and the target angle discriminants.

12. The method for target tracking of claim 11, wherein generating target kinematics comprises generating the state vectors according to the matrix equation:

$$\overbrace{\begin{pmatrix} obs_1 & -1 & obs_1\Delta t(1) & -\Delta t(1) & \frac{1}{2}\Delta t^2(1) & obs_1 - \frac{1}{2}\Delta t^2(1) \\ obs_2 & -1 & obs_2\Delta t(2) & -\Delta t(2) & \frac{1}{2}\Delta t^2(2) & obs_2 - \frac{1}{2}\Delta t^2(2) \\ \vdots & \vdots & \vdots & \vdots & \vdots & \vdots \\ obs_n & -1 & obs_n\Delta t(n) & -\Delta t(n) & \frac{1}{2}\Delta t^2(n) & obs_n - \frac{1}{2}\Delta t^2(n) \end{pmatrix}}^{H} \overbrace{\begin{pmatrix} x^{tgt} \\ y^{tgt} \\ v_{0x}^{tgt} \\ v_{0y}^{tgt} \\ a_{0x}^{tgt} \\ a_{0y}^{tgt} \end{pmatrix}_{(1)}}^{\vec{S}} =$$

$$\overbrace{\begin{pmatrix} obs_1 x^{os}(0) - y^{os}(0) \\ obs_2 x^{os}(0) - y^{os}(0) \\ \vdots \\ obs_n x^{os}(0) - y^{os}(0) \end{pmatrix}}^{\vec{b}}.$$

* * * * *